May 9, 1944.  P. H. DIJKSTERHUIS  2,348,245
DEVICE FOR CONVERTING VARIATIONS OF MECHANICAL QUANTITIES
INTO VARIATIONS OF ELECTRIC VOLTAGES
Filed April 9, 1941

INVENTOR
P.H. Dijksterhuis
By
ATTORNEY

Patented May 9, 1944

2,348,245

UNITED STATES PATENT OFFICE 2,348,245

DEVICE FOR CONVERTING VARIATIONS OF A MECHANICAL QUANTITY INTO VARIATIONS OF AN ELECTRIC VOLTAGE

Pieter Heertje Dijksterhuis, Eindhoven, Netherlands; vested in the Alien Property Custodian Application April 9, 1941, Serial No. 387,780
In the Netherlands May 1, 1940

4 Claims. (Cl. 177—380)

This invention relates to a device for converting variations of a mechanical quantity into electrical variations in which device the electrical variations are obtained by the alteration of an electrical impedance by the mechanical quantity. More particularly the invention relates to a device in which there exists a non-linear relationship between the changes in the impedance and/or the voltages across the same and the changes in the mechanical quantity.

The mechanical quantity may be, for example, the pressure occurring in the cylinder of an internal-combustion engine or the shape of a machine component which is subjected to variations in form or position under the influence of mechanical forces. The impedance may be constituted, for example, by an electrical resistance whose value becomes modified by variation in position or shape or may be constituted by a condenser in which the distance between the electrodes is varied in a manner corresponding to the variations of the mechanical quantity.

Due to the absence of a linear relationship between the variations of the mechanical quantity and the resulting alternating voltage output, a device of the said kind is not well adapted as a measuring device. According to the invention, this disadvantage is obviated by feeding the voltage developed across the impedance or a voltage dependent thereon to a transmission circuit whose damping depends in such manner on the voltage supplied that the non-linear nature is balanced.

Preferably, in a device in which the variations of the mechanical quantity are converted into a modulation of a high-frequency alternating voltage by variation of the value of a condenser which is influenced by the mechanical quantity, the modulated high-frequency voltage is fed to an amplifier from which a control voltage dependent on the instantaneous value of the enveloping curve of the modulated high-frequency voltage is obtained. The control voltage varies the amplification of one or more of the valves of the amplifier so as to ensure a linear relation between the amplified modulated high-frequency voltage and/or the low-frequency voltage obtained after detection of this voltage and the variations of the mechanical quantity. The word "damping" is herein employed to define the ratio of the output voltage to the input voltage of the transmission circuit.

In order that the invention may be clearly understood and readily carried into effect it will now be set out more fully with reference to the accompanying drawing in which.

Figure 1:
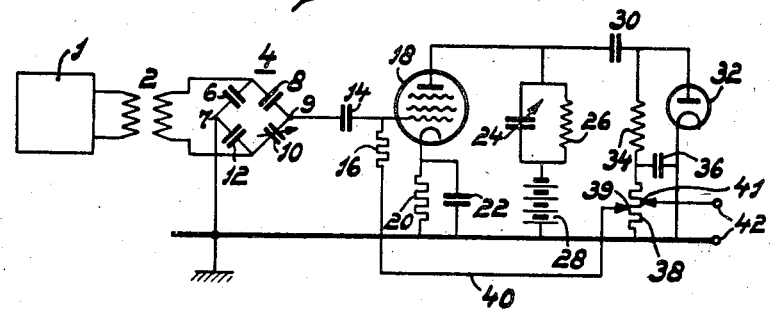
Figure 1 is a schematic diagram illustrating a circuit arrangement in accordance with the preferred embodiment of the invention.

Referring to Fig. 1, 1 designates a generator for setting up high-frequency oscillations whose output voltage is fed via a transformer 2 to a bridge connection 4 comprising four condensers 6, 8, 10 and 12. One of these condensers, for example 10, serves for converting variations of a mechanical quantity, for example variations in pressure, into variations in capacity. This condenser comprises a stationary electrode and a simple preferably plane diaphragm-shaped electrode, the latter being influenced by the variations in pressure to be converted. The flexion of the diaphragm thus brought about alters the distance between the electrodes and results in variations in the capacity of the condenser.

The bridge connection 4 is preferably so adjusted that when the pressure exerted on the diaphragm-shaped electrode is zero there is no voltage between the corners 7 and 9. Any increase in pressure has the effect of decreasing the distance between the electrodes of the condenser 10 and thus of increasing the capacity with the result that there occurs between the corners 7 and 9 of the bridge connection a high-frequency voltage whose amplitude depends on the voltage across the condenser 10 and hence on the variations in pressure that occur.

The so modulated high-frequency voltage between the terminals 7 and 9 is fed via a condenser 14 and across a resistance 16 to the control grid of an amplifier valve, for example a pentode 18, whose cathode lead includes a resistance 20 with a parallel condenser 22 for obtaining a negative grid bias. The anode circuit of the valve 18 includes an oscillatory circuit which comprises a condenser 24 and a coil 26 and is tuned to the frequency of the generator 1 and in addition includes a source of anode voltage, for example a battery 28. The anode of the valve 18 is connected to the anode of a diode 32 by the intermediary of a coupling condenser 30. The cathode of the diode 32 is earthed and the anode is connected to the cathode through a load resistance 38 via a filter constituted by a resistance 34 and a by-pass condenser 36, which suppresses the high frequency oscillations. A variable tap 39 on the resistance 38 is connected to the resistance 16 via a conductor 40, whereas a second tap 41 on the resistance 38 leads to one of the output terminals 42. The other output terminal 42 is earthed, as is also the corner 7 of the bridge connection 4.

The modulated high-frequency voltage occurring between the corners 7 and 9 of the bridge connection 4 is applied to the transmission circuit which comprises the amplifier valve 18 and the diode rectifier detector 32. The rectified output voltage whose amplitude is a measure of the variations in pressure that occur may be obtained from the terminals 42 and fed to an indicating device.

Figure 2:
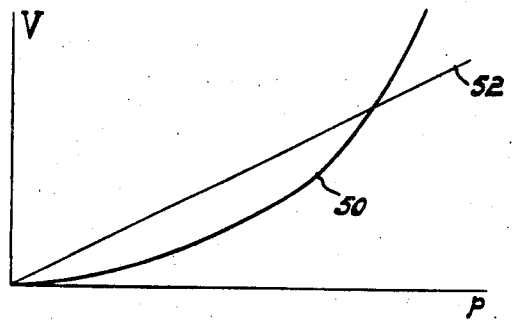
Fig. 2 is a graph showing the change in linearity obtained by the device of the invention.

If particular precautions are not taken the characteristic curve of the voltage V at terminals 42 varies non-linearly with respect to pressure $p$ as shown by the curve 50 of Fig. 2, with the result that the voltage V at terminals 42 is not well adapted for measuring the absolute value of the variations in pressure that occur.

In order to balance the non-linearity brought about by the non-linear relation between the variation in capacity of the condenser 10 and the pressure $p$ a variable part of the rectified voltage, which voltage is dependent on the instantaneous value of the enveloping curve of the high-frequency voltage amplified by the tube 18, is fed as a negative bias to the control grid of the valve 18 via the tap 39, the conductor 40 and the resistance 16. This expedient has the effect of rendering the amplification of the valve 18 dependent on the supplied voltage in such manner that if the pressure $p$ increases the working point on the grid-voltage anode-current characteristic curve of the valve 18 is displaced to a region of higher negative grid voltage where the mutual conductance and hence the gain is lower. Greater amplitudes of the high-frequency voltage are consequently subjected to a lower amplification. By means of the tap 39 on the resistance 38 the value of the injected voltage may be adjusted to control the amplification so that the valve 18 has a complementary amplification characteristic curve of output voltage V as a function of the input voltage $V_1$ which makes the characteristic curve of the voltage V as a function of the pressure $p$ a straight line as indicated by the curve 52 of Fig. 2.

Instead of the voltage which controls the gain of the valve 18 in accordance with the value of the high-frequency voltage fed to the valve 18 being derived from the detector 32 it may also be obtained from an independent detector which is arranged in front of the detector valve 32.

Instead of being obtained by a control of the gain as in the embodiment described, the desired characteristic curve of the transmission circuit may also be obtained otherwise, for example by a suitable choice of the valve characteristics.

What I claim is:

1. A device for converting mechanical variations into electrical voltages which are linearly proportional to the amplitude of the mechanical variations, comprising means to produce a high frequency alternating voltage, means to modulate said high frequency alternating voltage to produce amplitude variations thereof which are non-linearly proportional to the amplitudes of the mechanical variations, and means to convert the non-linear amplitude variations of the high frequency alternating voltage into amplitude variations linearly proportional to the amplitude of the mechanical variations, said latter means comprising a voltage transmission circuit comprising an amplifier for the modulated high frequency voltage and means to produce a control voltage proportional to the non-linear amplitude variations of the modulated high frequency voltage and adapted to vary the amplification of said amplifier.

2. A device for converting mechanical variations into electrical voltages which are linearly proportional to the amplitude of the mechanical variations, comprising means to produce a high frequency alternating voltage, a variable impedance associated with said means, said impedance being controlled by the mechanical variations and adapted to modulate said high frequency alternating voltage and produce amplitude variations thereof which are non-linearly proportional to the amplitude of the mechanical variations, and means to convert the non-linear amplitude variations of the high frequency alternating voltage into voltages linearly proportional to the mechanical variations, said latter means comprising a voltage transmission circuit comprising an amplifier associated with said impedance and a demodulator associated with said amplifier and means comprising said demodulator to apply to said amplifier a control voltage proportional to the non-linear amplitude variations of the high frequency alternating voltage.

3. A device for converting mechanical variations into electrical voltages which are linearly proportional to the amplitude of the mechanical variations, comprising means to produce a high frequency alternating voltage, a variable impedance associated with said means, said impedance being controlled by the mechanical variations and adapted to modulate said high frequency alternating voltage and produce amplitude variations thereof which are non-linearly proportional to the amplitude of the mechanical variations, and means to convert the non-linear amplitude variations of the high frequency alternating voltage into voltages linearly proportional to the mechanical variations, said latter means comprising a voltage transmission circuit comprising an amplifier valve associated with said impedance and having a control electrode, and means to impress on said control electrode a control voltage proportional to the non-linear amplitude variations of the high frequency alternating voltage to thereby vary the amplification of said valve proportional to the amplitude of the variations of said high frequency voltage, said latter means comprising a rectifier energized by said amplifier valve and a resistor member energized by said rectifier, said resistor member being associated with said control electrode in phase opposition.

4. A device for converting mechanical variations into electrical voltages which are linearly proportional to the amplitude of the mechanical variations, comprising means to produce a high-frequency alternating voltage, a variable impedance device comprising four impedance elements connected in bridge circuit arrangement, one diagonal of the bridge circuit being connected to the voltage generating means, one of said impedances being controlled by the mechanical variations and being adapted to produce at the other diagonal of said bridge circuit amplitude variations of the high-frequency alternating voltage which are non-linearly proportional to the amplitude of the mechanical variations, and means to convert the non-linear amplitude variations of the high-frequency alternating voltage into voltages linearly proportional to the mechanical variations, said latter means comprising a voltage transmission circuit comprising an amplifier valve connected to said second diagonal of the bridge circuit and having a control electrode, and means to impress on said control electrode a control voltage proportional to the non-linear amplitude variations of the high-frequency alternating voltage to thereby vary the amplification of said valve proportional to the amplitude of the variations of said high-frequency voltage, said latter means comprising a rectifier energized by said amplifier valve and a resistor member energized by said rectifier, said resistor member being coupled to said control electrode in phase opposition.

PIETER HEERTJE DIJKSTERHUIS.